US008790789B2

(12) United States Patent
Ramgopal et al.

(10) Patent No.: US 8,790,789 B2
(45) Date of Patent: Jul. 29, 2014

(54) EROSION AND CORROSION RESISTANT COATINGS, METHODS AND ARTICLES

(75) Inventors: Thodla Ramgopal, Dublin, OH (US); Krishnamurthy Anand, Karnataka (IN); David Vincent Bucci, Simpsonville, SC (US); Nitin Jayaprakash, Karnataka (IN); Jane Marie Lipkin, Niskayuna, NY (US); Tamara Jean Muth, Ballston Lake, NY (US); Surinder Singh Pabla, Greer, SC (US); Vinod Kumar Pareek, Albany, NY (US); Guru Prasad Sundararajan, Basavanagar (IN)

(73) Assignee: General Electric Company, Niskayuna, NY (US)

( * ) Notice: Subject to any disclaimer, the term of this patent is extended or adjusted under 35 U.S.C. 154(b) by 1798 days.

(21) Appl. No.: 12/128,849

(22) Filed: May 29, 2008

(65) Prior Publication Data

US 2009/0297720 A1 Dec. 3, 2009

(51) Int. Cl.
| | | |
|---|---|---|
| *B32B 15/04* | (2006.01) |
| *C23C 4/04* | (2006.01) |
| *C23C 4/06* | (2006.01) |
| *C23C 30/00* | (2006.01) |
| *B05D 1/00* | (2006.01) |
| *B05D 1/02* | (2006.01) |
| *B05D 7/14* | (2006.01) |
| *C22C 19/07* | (2006.01) |
| *F01D 5/14* | (2006.01) |

(52) U.S. Cl.
CPC .. *C23C 4/06* (2013.01); *Y02T 50/67* (2013.01); *C23C 30/00* (2013.01)
USPC ........... 428/546; 428/553; 428/548; 428/678; 428/679; 428/627; 420/437; 416/241 R; 427/455; 427/201

(58) Field of Classification Search
USPC ......... 428/546, 548, 553, 558, 559, 567, 678, 428/679, 680, 681, 684, 685, 627, 632; 420/435, 436, 437, 438, 439, 440
See application file for complete search history.

(56) References Cited

U.S. PATENT DOCUMENTS

| 4,328,285 | A | * | 5/1982 | Siemers et al. | 428/633 |
|---|---|---|---|---|---|
| 4,593,007 | A | * | 6/1986 | Novinski | 501/105 |
| 4,599,270 | A | * | 7/1986 | Rangaswamy et al. | 428/402 |
| 4,692,305 | A | * | 9/1987 | Rangaswamy et al. | 420/436 |
| 4,910,095 | A | * | 3/1990 | Izaki et al. | 428/623 |
| 5,712,050 | A | * | 1/1998 | Goldman et al. | 428/680 |
| 7,141,110 | B2 | | 11/2006 | Gray et al. | |
| 7,300,708 | B2 | | 11/2007 | Gigliotti, Jr. et al. | |
| 2003/0180565 | A1 | * | 9/2003 | Herbst-Dederichs | 428/553 |
| 2003/0224181 | A1 | * | 12/2003 | Finley et al. | 428/432 |
| 2005/0112399 | A1 | | 5/2005 | Gray et al. | |
| 2005/0112411 | A1 | | 5/2005 | Gray et al. | |
| 2005/0207896 | A1 | | 9/2005 | Gigliotti, Jr. et al. | |
| 2005/0255329 | A1 | | 11/2005 | Hazel | |
| 2007/0031702 | A1 | | 2/2007 | Gray et al. | |
| 2007/0048550 | A1 | * | 3/2007 | Millero et al. | 428/704 |
| 2007/0048556 | A1 | * | 3/2007 | Spahn | 429/12 |
| 2007/0099027 | A1 | * | 5/2007 | Krishnamurthy et al. | 428/698 |
| 2007/0128447 | A1 | * | 6/2007 | Hazel et al. | 428/426 |
| 2007/0141369 | A1 | | 6/2007 | Hazel et al. | |
| 2007/0196686 | A1 | | 8/2007 | Nagaraj et al. | |
| 2007/0275256 | A1 | * | 11/2007 | Ragunathan et al. | 428/500 |
| 2008/0090069 | A1 | * | 4/2008 | Walters et al. | 428/330 |
| 2008/0167173 | A1 | * | 7/2008 | Lima et al. | 501/80 |

OTHER PUBLICATIONS

Okanda, et al., "Effect of Ce Additions on the Microstructure and High Temperature Corrosion Behavior of Fe-30Cr-5Al Alloys," in Trans. Jap. Institute Metals, vol. 27, No. 9 (1986, no month), pp. 680-692.*

* cited by examiner

*Primary Examiner* — Michael E La Villa
(74) *Attorney, Agent, or Firm* — Paul J. DiConza

(57) ABSTRACT

Disclosed herein is an erosion and corrosion resistant coating comprising a metallic binder, a plurality of hard particles, and a plurality of sacrificial particles. Also disclosed is a method of improving erosion and corrosion resistance of a metal component comprising disposing on a surface of the metal component the foregoing erosion and corrosion resistant coating comprising, and a metal component comprising a metal component surface and the foregoing erosion and corrosion resistant coating comprising a first surface and a second surface opposite the first surface, wherein the first surface is disposed on the metal component surface.

16 Claims, No Drawings

EROSION AND CORROSION RESISTANT COATINGS, METHODS AND ARTICLES

BACKGROUND

Some metal components, such as turbine components, operate under extreme operating conditions. The turbine can be a gas turbine, a hydroelectric turbine, a steam turbine, or the like. The foregoing extreme operating conditions include elevated temperatures, elevated pressures, corrosive environments, friction, erosion, or the like, or a combination thereof.

The metal components can be subjected to two or more of the foregoing extreme operating conditions in combination, such as, corrosion and erosion. For example, a hydroelectric turbine component can be subjected to erosion by impingement of silt (sand in the water) and particles contained therein (e.g., $SiO_2$, $Al_2O_3$, $Fe_2O_3$, MgO, CaO, clays, volcanic ash, and the like) that are carried by moving bodies of water. A steam turbine component can be subjected to erosion due to water droplets. During the operation of an industrial gas turbine or steam turbine, water droplets tend to form or are deliberately introduced, as in the case of the gas turbine. The droplets can deposit on stationary components where they coalesce into films or rivulets and slowly move to the trailing edge of the component. The films and/or rivulets are then removed by the steam flow in the form of large drops. These large drops impact certain components at an elevated velocity. The impact of water drops generates an impulsive contact pressure on the component surface causing progressive loss of component material, i.e., erosion.

In addition to erosion, the above exemplified hydroelectric turbine component, industrial gas turbine component, and steam turbine component can additionally be subjected to corrosion. For example, water, steam, metal salts such as alkaline sulfate, sulfites, chlorides, carbonates, oxides, and other salts resulting from ingested dirt, fly ash, volcanic ash, concrete dust, sand, sea salt, or the like, are a source of corrosion. Corrosion causes pitting and/or loss of the metal components, which can lead to failure or premature removal and replacement of the components.

The metal components are generally provided with separate coatings that impart various characteristics, such as corrosion resistance, heat resistance, oxidation resistance, wear resistance, erosion resistance, or the like. However, there is a lack of coatings that are singly effective at addressing a combination of two or more of the foregoing extreme operating conditions, such as a combination of corrosion and erosion.

Therefore, a coating that is effective at protecting a metal component, such as a turbine component, against the simultaneous negative effects of corrosion and erosion would be advantageous.

SUMMARY

The above described and other drawbacks are alleviated by an erosion and corrosion resistant coating comprising a metallic binder, a plurality of hard particles, and a plurality of sacrificial particles.

In one embodiment, a method of improving erosion and corrosion resistance of a metal component comprises disposing on a surface of the metal component an erosion and corrosion resistant coating comprising a metallic binder, a plurality of hard particles, and a plurality of sacrificial particles.

In another embodiment, a metal component comprises a metal component surface and an erosion and corrosion resistant coating comprising a first surface and a second surface opposite the first surface, wherein the first surface is disposed on the metal component surface, and wherein the erosion and corrosion resistant coating comprises a metallic binder, a plurality of hard particles, and a plurality of sacrificial particles.

DETAILED DESCRIPTION

Surprisingly, the present inventors have discovered that a coating comprising a metallic binder, a plurality of hard particles, and a plurality of sacrificial particles, is effective at providing metal components with simultaneous erosion and corrosion resistance.

Not wishing to be bound by theory, but it is believed that the coating and substrate as a combination under a corrosive media offer corrosion protection to the substrate due to a compositional design that imparts anodicity to the coating, through development of local anodic cells, or through hermetic sealing of the substrate from the environment by the coating. In addition, since the environment these coatings are exposed to is erosive due to the presence of hard particles or water droplets, wear resistance is improved while preserving the corrosion resistance of the coating. In some embodiments, it is believed that the hard particles can decompose in a controlled manner to further impart anodic characteristics to the coating. The coating can also provide corrosion protection should the protective coating breach, through sacrificial particles that can provide self healing characteristics.

The metallic binder includes a variety of suitable metals and metal alloys, such as cobalt, cobalt alloys, cobalt-chromium alloys, cobalt-aluminum alloys, cobalt-chromium-tungsten-carbon alloys, laves phase cobalt alloys, nickel alloys, ferrous alloys, nickel-aluminum alloys, nickel-chromium-aluminum alloys, cobalt-nickel-chromium-aluminum-yttrium alloys, nickel-cobalt-chromium-tungsten alloys, cobalt-molybdenum-chromium-silicon alloys, shape memory alloys, and the like, and combinations thereof.

Non-limiting examples of cobalt alloys include superalloys comprising at least about 30 percent by weight of cobalt such as HAYNES and ULTIMET obtained from Haynes International, Inc., and STELLITE obtained from Deloro Stellite Company, Inc.

Non-limiting examples of nickel alloys include superalloys comprising at least about 40 percent by weight of nickel, such as INCONEL, NIMONIC, and UDIMET obtained from the Special Metals Corporation family of companies, and RENE obtained from the General Electric Company.

Non-limiting examples of shape memory alloys include nickel-titanium alloys, indium-titanium alloys, nickel-aluminum alloys, nickel-gallium alloys, copper alloys (e.g., copper-zinc alloys, copper-aluminum alloys, copper-gold alloys, and copper-tin alloys), gold-cadmium alloys, silver-cadmium alloys, indium-cadmium alloys, manganese-copper alloys, iron-platinum alloys, iron-palladium alloys, ruthenium-niobium alloys, ruthenium-tantalum alloys, titanium alloys, iron alloys, and the like. The alloys can be binary, ternary, or any higher order so long as the alloy composition exhibits a shape memory effect, e.g., changes in shape orientation, changes in yield strength, and/or flexural modulus properties, damping capacity, superelasticity, and the like upon heating or cooling through phase transition temperatures or upon stress or strain induced phase transition.

Non-limiting examples of shape memory alloys are nickel-titanium based alloys commercially available under the tradename NITINOL from Shape Memory Applications, Inc.

In one advantageous embodiment, the metallic binder comprises a superalloy of cobalt, nickel, or a combination thereof. In another advantageous embodiment, the metallic binder comprises a nickel-titanium shape memory alloy.

As used herein, "hard particles" refer to materials that can withstand the high velocity impact of eroding species, such as high velocity water droplets, silt, sand, and the like. The hard particles can have a Mohs hardness of about 7 to about 10, with 10 being the hardness of diamond. However, a Mohs hardness of less than about 7 is also possible if the particles do not adversely affect the erosion and corrosion resistant coating. In some embodiments, hard particle can also enhance the corrosion protection of the matrix. For example, particles such as aluminum nitride, magnesium boride, or the like can partially decompose in a thermal spray process releasing native aluminum or magnesium into the metallic matrix, rendered the matrix more anodic or enhancing the sacrificial nature of the coating.

Non-limiting examples of the hard particles include tungsten carbide, molybdenum carbide, titanium carbide, titanium nitride, titanium boride, chromium carbide, chromium oxide, silicon carbide, silicon oxide, silicon nitride, diamond, boron nitride, magnesium boride, magnesium nitride, magnesium oxide, aluminum nitride, aluminum carbide, aluminum oxide, aluminum boride, zirconium oxide, titanium oxide, aluminum titanium oxide, and the like, and a combination thereof.

The hard particles are used as a plurality of particles, which has a volume fraction of about 1 to about 99 percent by volume, based on the total volume of the erosion and corrosion resistant coating. In one embodiment, the plurality of hard particles has a volume fraction of about 30 to about 95 percent by volume, specifically about 35 to about 70 percent by volume, more specifically about 40 to about 60 percent by volume, and even more specifically about 45 to about 55 percent by volume, based on the total volume of the erosion and corrosion resistant coating. In one exemplary embodiment, the plurality of hard particles has a volume fraction of about 30 to about 80 percent by volume, based on the total volume of the erosion and corrosion resistant coating.

The hard particles can have an average particle size of about 10 nanometers (nm) to about 10 micrometers (μm). Specifically, the average particle size is of about 20 nm to about 8 μm, and more specifically of about 50 nm to about 5 μm.

In one advantageous embodiment, the average particle size of the hard particles is of about 10 nm to about 5 μm, with a significant portion of hard particles having a particle size of about 10 nm to about 400 nm, more specifically about 20 to about 200 nm, and the remaining hard particles having a particle size less than about 2 μm, and specifically less than about 1 μm. As used herein, "a significant portion" refers to greater than about 30 percent by weight, based on the total weight of the hard particles. While not wishing to be bound by theory, it is believed that the smaller hard particles, that is, the hard particles having a particle size of about 10 nm to about 400 nm, provide erosion resistance against the entire size distribution of impacting solid particles such as sand or silt, and against water droplets and other eroding particles. On the other hand, the bigger hard particles, that is, the hard particles having a particle size less than about 2 μm, provide resistance against the flow of metal (e.g., as a result of impact by an eroding particle) which is disadvantageous and can lead to failure of the erosion and corrosion resistant coating.

As used herein, a "sacrificial particle" refers to any particle that imparts the erosion and corrosion resistant coating with a "self-healing" characteristic, that is, the sacrificial particle undergoes a change, such as a chemical change, in order to impart protection to an exposed section of a metal component coated by the erosion and corrosion resistant coating.

While not wishing to be bound by theory, it is believed that generally, the sacrificial particle is a multivalent particle that is soluble or mobile in the metallic binder in one valence state, but can precipitate and form a protective layer in a pit or on an exposed section of the metal component in another valence state. However, other particles that are sacrificial in nature and are not multivalent can also be used.

Non-limiting examples of the sacrificial particles include hexavalent chromium particles, tetravalent cerium particles, cerium oxide, and the like, and combinations thereof. The chromium, cerium, and cerium oxide particulates can be easily obtained from commercially available sources having an average diameter of about 0.1 to about 5 μm. They are generally sized in such a manner that they are smaller than the hard particles so that they can be easily dispersed in the interstices between the hard particles and within the metallic binder. Not wishing to be bound by theory, but it is believed that such fine dispersion of the sacrificial particles results in a high probability of them coming in contact with the corrosive media should it percolate into the coating in the event of a mechanical breach. In an advantageous embodiment, the average diameter of the sacrificial particles is about 0.1 to about 2 μm. The volume fraction of the sacrificial particles is less than about 50 percent by volume, based on the total volume of the coating.

In one embodiment, the erosion and corrosion resistant coating can further comprise one or several nano- or micro-layers disposed thereon. Non-limiting examples of the nano- and micro-layers include layers of metal nitrides, metal borides, metal carbides, metal carbonitrides, and the like, and combinations thereof.

Non-limiting examples of metal nitrides include aluminum nitride, chromium nitride, titanium nitride, silicon nitride, tantalum nitride, cerium nitride, hafnium nitride, zirconium nitride, molybdenum nitride, tungsten nitride, and niobium nitride.

Non-limiting examples of metal carbides include aluminum carbide, chromium carbide, titanium carbide, silicon carbide, tantalum carbide, cerium carbide, hafnium carbide, yttrium carbide, zirconium carbide, molybdenum carbide, tungsten carbide and niobium carbide.

A metal carbonitride can also be used. Non-limiting examples of metal carbonitrides include aluminum carbonitride, chromium carbonitride, titanium carbonitride, silicon carbonitride, tantalum carbonitride, cerium carbonitride, hafnium carbonitride, yttrium carbonitride, zirconium carbonitride, molybdenum carbonitride, tungsten carbonitride, and niobium carbonitride.

Non-limiting examples of metal borides include titanium boride, aluminum boride, magnesium boride, zirconium boride, hafnium boride, niobium boride, tantalum boride, chromium boride, nickel boride, molybdenum boride, tungsten boride, and iron boride.

Thus, any stable, metal carbide, nitride, carbonitride, or boride can be used for the nano- or micro-layers. In one embodiment, pure, elemental metal nitrides, metal carbides, metal carbonitrides, and metal borides are specifically used. In another embodiment, mixtures of metal nitrides, metal carbides, metal carbonitrides, and/or metal borides can be advantageous. In one advantageous embodiment, the metal nitride is selected from aluminum nitride. In one exemplary advantageous embodiment, the metal nitride is selected from titanium nitride.

One embodiment is a method of improving erosion and corrosion resistance of a metal component, comprising disposing on a surface of the metal component the above described erosion and corrosion resistant coating. As used herein, "disposed on" and similar referents refer to at least in partial contact with, specifically at least in substantial contact with, and advantageously in full contact with.

The surface of the metal component is generally a surface prone to erosion and corrosion, such as surfaces in a turbine exposed to the environment. The metal component is generally a superalloy, however, any metal alloy prone to erosion and corrosion can be coated with the above erosion and corrosion resistant coating. The surface of the metal component can be of the same composition as the metal component, or it can be pre-treated or pre-coated with another treatment and/or coating, or pre-coated with the erosion and corrosion resistant coating disclosed herein.

Disposing the erosion and corrosion resistant coating on the metal component can be effected using any suitable technique available to one with ordinary skill in the art, such as thermal spray processes, e.g., high velocity oxygen fuel thermal spray processes (HVOF) and high velocity air fuel thermal spray processes (HVAF), plasma spray processes such as low pressure plasma spray processes (LLPPS), detonation gun spray processes (D-Gun), laser cladding processes, spark erosion processes, and the like.

In one advantageous embodiment, a HVAF process is employed for disposing the erosion and corrosion resistant coating on the surface of the metal component. HVAF is a material deposition process where coatings are applied by exposing a substrate to a high-velocity jet at about 600 to about 800 meters per second (m/s) of about 5 to about 45 μm particles that are accelerated and heated by a supersonic jet of low-temperature "air-fuel gas" combustion products. The HVAF process produces an extremely dense (minimal porosity) and substantially non-oxidized coating. Moreover, increased thicknesses can be obtained relative to other thermal and/or plasma spray processes, resulting in metal components exhibiting superior erosion and corrosion resistance properties.

The HVAF process utilizes a fuel such as propane or propylene, or the like combusted with air as opposed to oxygen, which is used in the HVOF process. As a result, the thermally sprayed particulate feedstock is exposed to a lower temperature as compared to the HVOF process. Since the HVAF process ensures a high particle velocity of about 600 to about 800 m/s and a lower particle temperature, the erosion and corrosion resistant coatings produced thereby have lower levels of oxidation and decarburization as well as lower residual stresses.

Robotic application of HVAF coatings is an advantageous method to deposit the erosion and corrosion resistant coating compositions. A feedstock of the erosion and corrosion resistant coating composition is prepared using any standard commercially available process, such as by casting and crushing the composition, agglomerating/sintering and crushing, or by mechanical milling, or the like, to produce particles of suitable size for HVAF, that is, about 5 to about 45 μm, and advantageously about 5 to about 25 μm.

The feedstock particles are heated (not melted) to generate a high kinetic energy due to the flame velocity. Particles splat out upon impact with the surface to be coated thereby forming a coating. The high velocity and lower temperatures employed reduce decarburization of primary carbides if present and enable thicker and denser coatings due to the lower residual stresses associated with the process.

Thicknesses in excess of 500 μm can be obtained, and can provide coatings on metal components suitable for prolonged exposure to eroding and corroding environments.

The above method of improving erosion and corrosion resistance of the metal component can advantageously comprise disposing one or several nano- and/or micro-layers on the erosion and corrosion resistant coating.

Thus, in one embodiment, the erosion and corrosion resistant coating comprises a first surface disposed on the surface of the metal component, and a second surface opposite the first surface, and wherein the above method further comprises disposing the one or several nano- and/or micro-layers on the second surface of the erosion and corrosion resistant coating.

In one embodiment, one or several of the nano- and/or micro-layers are disposed on the erosion and corrosion resistant coating, all of which comprising the same material. In one advantageous embodiment, the material is selected from titanium nitride and aluminum nitride. In another embodiment, if more than one layer is used, the layers can have different characteristics from one another. For example, layers can include alternating first layers and second layers. The first layers comprise a first material and the second layers comprise a second material different from the first material. In one embodiment, the nano- and/or micro-layers comprise alternating layers of titanium nitride and aluminum nitride. In another embodiment, the nano- and/or micro-layers comprise alternating layers of titanium nitride and zirconium nitride.

In one embodiment, metal layers can be included between two of the nano- and/or micro-layers. For example, a layer of titanium can be included between two layers of titanium nitride.

The thickness of each of the nano- and/or micro-layers can be varied according to the level of protection required of each component. Generally, the thickness of each of the nano- and/or micro-layers is about 2 nm to about 2 μm. Specifically, the thickness is about 3 nm to about 1 μm, more specifically about 5 nm to about 500 nm, more specifically about 10 nm to about 200 nm, and even more specifically about 20 nm to about 100 nm. The thickness of the layers can be independently adjusted to control the hardness, strain tolerance and overall stability of the nano- and/or micro-layers when subjected to stress.

The total thickness of the nano- and/or micro-layers can be about 2 nm to about 50 μm, more specifically about 20 nm to about 40 μm, more specifically about 200 nm to about 30 μm, more specifically about 1 μm to about 25 μm, more specifically about 1 μm to about 20 μm, and even more specifically about 5 μm to about 10 μm. The number of layers utilized can vary, depending on the thickness of each of the layers and the desired thickness of the total nano- and/or micro-layers.

Disposing the nano- and/or micro-layers on the erosion and corrosion resistant coating can be effected using any suitable method known in the art, including but not limited to chemical vapor deposition (CVD), metal organic chemical vapor deposition (MO-CVD), physical vapor deposition (PVD), cathodic arc deposition, reactive sputtering and molecular beam epitaxy (MBE).

CVD techniques generally involve a vapor coating apparatus including a chamber in which an article to be coated is placed (such as the metal component comprising the erosion and corrosion resistant coating disposed thereon). The chamber may then be heated to a desired deposition temperature with use of appropriate heaters, such as resistance heaters. This temperature is dependent upon the base metal material, as well as the composition of the nano- and/or micro-layer to be deposited. Reagents that produce a deposition vapor can be placed in a heated reagent source chamber. The reagents can include volatile organic, inorganic, and organometallic chemical compounds that contain the elements to be deposited. A vapor is thus produced that contains and transports the constituents needed to form the nano- and/or micro-layers.

A cathodic arc deposition apparatus generally involves a vacuum chamber that includes an anode, a power supply, and a cathode target assembly connected to the power supply. The cathode target assembly includes a cathode target of the metal desired in the metal nitride, metal carbide, metal carbonitride, or metal boride coating and a target holder. The deposition chamber is first evacuated to a pressure of less than $5\times10^{-3}$ pascals (Pa). An arc is generated using an electronic trigger and an external magnetic field sustains the arc on the face of the cathode target generating an intense source of highly ionized plasma ideal for depositing materials onto substrate surfaces. A bias voltage is established between the cathode target and the component requiring coating to drive deposition of the target composition. By introducing controlled gases to the ionized plasma cloud, a compound of the target and introduced gas can be deposited on the substrate. For example, a pure titanium target can be ionized and nitrogen introduced into the chamber to a pressure of $6\times10^2$ Pa. The substrates can be biased using a radio frequency (RF) source at −40 volts and the arc current during deposition can be maintained at 50 amperes (A). This process generates deposition rates on the order of 35-40 nm per minute with deposition temperatures of approximately 400° C.

In one embodiment, a metal component comprises a metal component surface and the above erosion and corrosion resistant coating comprising a first surface and a second surface opposite the first surface, wherein the first surface is disposed on the metal component surface.

The metal component can further comprise one or several of the above nano- and/or micro-layers disposed on the second surface of the erosion and corrosion resistant coating.

The component can be any component where simultaneous erosion and corrosion resistance is desired. Such components include, but are not limited to, turbines, such as gas turbines, hydroelectric turbines, steam turbines, and the like. Non-limiting examples of components of such turbines where simultaneous erosion and corrosion resistance is desired include compressor blades, stator vanes, buckets, diaphragms, nozzles, expanders, and the like, and combinations thereof. In one exemplary advantageous embodiment, the component is a turbine component prone to erosion caused by water droplets and/or solid particles, and further prone to corrosion.

The invention is further illustrated by the following non-limiting examples.

Examples 1-4

Four identical hydroelectric turbine blade samples were coated using HVAF with coatings comprising the composition illustrated in Table I below. C is comparative, while E is inventive.

TABLE 1

|  | C1 | C2 | E3 | E4 |
| --- | --- | --- | --- | --- |
| Metallic binder (vol %) | 25 | 30 | 20 | 20 |
| Tungsten carbide particles or other hard particles (vol %) | 75 | 0 | 68 | 68 |
| Hexavalent chromium particles (vol %) | 0 | 25 | 4 | 4 |
| Hexavalent cerium particles (vol %) | 0 | 45 | 8 | 8 |

The metallic binder was a cobalt-molybdenum-chromium-silicon TRIBALOY alloy. The coatings have a thickness of 100 μm. E4 was further coated with a 1 μm thick combination of titanium nitride layers using a cathodic arc process.

The coated samples were exposed for 120 minutes to a water column at room temperature having an impinging velocity of 230 m/s. The diameter of the water column was 800 μm. The water had a 1 molar concentration of sodium sulfite.

Both E3 and E4 exhibit a total volume loss substantially smaller than C1 and C2, with the volume loss of E4 being slightly less than that of E3.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. Further, it is understood that disclosing a range is specifically disclosing all ranges formed from any pair of any upper range limit and any lower range limit within this range, regardless of whether ranges are separately disclosed. It is not intended that the scope of the invention be limited to the specific values recited when defining a range.

The use of the terms "a", "an", "the", and similar referents in the context of describing the invention (especially in the context of the following claims) are to be construed to cover both the singular and the plural, unless otherwise indicated herein or clearly contradicted by context. Further, it should be noted that the terms "first", "second", and the like herein do not denote any order, quantity, or importance, but rather are used to distinguish one element from another.

The modifier "about" used in connection with a quantity is inclusive of the stated value and has the meaning dictated by the context (e.g., it includes the degree of error associated with measurement of the particular quantity).

What is claimed is:

1. An erosion and corrosion resistant coating, comprising:
    a metallic binder comprising a cobalt alloy, a cobalt-based superalloy, or a combination thereof;
    a plurality of hard particles comprising particles of tungsten carbide; and
    a plurality of sacrificial particles, wherein the plurality of sacrificial particles is dispersed within the metallic binder, and wherein the plurality of sacrificial particles comprises particles of hexavalent chromium.

2. The erosion and corrosion resistant coating of claim 1, wherein the metallic binder comprises a cobalt chromium alloy, a cobalt aluminum alloy, a cobalt chromium tungsten carbon alloy, a laves phase cobalt alloy, a cobalt nickel chromium aluminum yttrium alloy, a nickel cobalt chromium tungsten alloy, a cobalt molybdenum chromium silicon alloy, or a combination thereof.

3. The erosion and corrosion resistant coating of claim 1, further comprising a nano-layer, a micro-layer, or a combination thereof disposed on the erosion and corrosion resistant coating.

4. The erosion and corrosion resistant coating of claim 3, wherein the nano-layer or the micro-layer comprises a metal nitride, a metal boride, a metal carbide, a metal carbonitride, or a combination thereof.

5. The erosion and corrosion resistant coating of claim 1, wherein the plurality of hard particles is dispersed within the metallic binder.

6. The erosion and corrosion resistant coating of claim 1, wherein the binder comprises a cobalt-based superalloy.

7. A metal component, comprising:
a metal component surface;
an erosion and corrosion resistant coating comprising a first surface and a second surface opposite the first surface,
wherein the first surface is disposed on the metal component surface, and
wherein the erosion and corrosion resistant coating comprises:
a metallic binder comprising a cobalt alloy, a cobalt-based superalloy, or a combination thereof;
a plurality of hard particles comprising particles of tungsten carbide; and
a plurality of sacrificial particles, wherein the plurality of sacrificial particles is dispersed within the metallic binder, and wherein the plurality of sacrificial particles comprises particles of hexavalent chromium.

8. The metal component of claim 7, wherein the metallic binder comprises a cobalt chromium alloy, a cobalt aluminum alloy, a cobalt chromium tungsten carbon alloy, a laves phase cobalt alloy, a cobalt nickel chromium aluminum yttrium alloy, a nickel cobalt chromium tungsten alloy, a cobalt molybdenum chromium silicon alloy, or a combination thereof.

9. The metal component of claim 7, further comprising a nano-layer, a micro-layer, or a combination thereof disposed on the second surface of the erosion and corrosion resistant coating.

10. The metal component of claim 7, wherein the metal component comprises a turbine compressor blade, a turbine stator vane, a turbine bucket, a turbine diaphragm, a turbine nozzle, a turbine expander, or a combination thereof.

11. A method of improving erosion and corrosion resistance of a metal component, comprising:
disposing on a surface of the metal component an erosion and corrosion resistant coating comprising:
a metallic binder comprising a cobalt alloy, a cobalt-based superalloy, or a combination thereof;
a plurality of hard particles comprising particles of tungsten carbide; and
a plurality of sacrificial particles, wherein the plurality of sacrificial particles is dispersed within the metallic binder, and wherein the plurality of sacrificial particles comprises particles of hexavalent chromium.

12. The method of improving erosion and corrosion resistance of the metal component of claim 11, wherein the metallic binder comprises a cobalt chromium alloy, a cobalt aluminum alloy, a cobalt chromium tungsten carbon alloy, a laves phase cobalt alloy, a cobalt nickel chromium aluminum yttrium alloy, a nickel cobalt chromium tungsten alloy, a cobalt molybdenum chromium silicon alloy, or a combination thereof.

13. The method of improving erosion and corrosion resistance of the metal component of claim 11, wherein the erosion and corrosion resistant coating comprises a first surface disposed on the surface of the metal component, and a second surface opposite the first surface, and wherein the method further comprises disposing a nano-layer, a micro-layer, or a combination thereof on the second surface of the erosion and corrosion resistant coating.

14. The method of improving erosion and corrosion resistance of the metal component of claim 13, wherein the nano-layer or the micro-layer comprises a metal nitride, a metal boride, a metal carbide, a metal carbonitride, or a combination thereof.

15. The method of improving erosion and corrosion resistance of the metal component of claim 11, wherein disposing the erosion and corrosion resistant coating on the surface of the metal component is effected by a thermal spray process, a high velocity oxygen fuel thermal spray process, a high velocity air fuel thermal spray process, a plasma spray process, a detonation gun spray process, a laser cladding process, a spark erosion process, or a combination thereof.

16. The method of improving erosion and corrosion resistance of the metal component of claim 11, wherein the metal component comprises a turbine compressor blade, a turbine stator vane, a turbine bucket, a turbine diaphragm, a turbine nozzle, a turbine expander, or a combination thereof.

* * * * *